United States Patent
Shiga et al.

(10) Patent No.: US 11,196,251 B2
(45) Date of Patent: Dec. 7, 2021

(54) CONNECTION APPARATUS

(71) Applicant: ZEON CORPORATION, Tokyo (JP)

(72) Inventors: Naomi Shiga, Tokyo (JP); Masayoshi Yoshida, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/770,070

(22) PCT Filed: Oct. 29, 2018

(86) PCT No.: PCT/JP2018/040143
§ 371 (c)(1),
(2) Date: Jun. 5, 2020

(87) PCT Pub. No.: WO2019/123839
PCT Pub. Date: Jun. 27, 2019

(65) Prior Publication Data
US 2021/0151983 A1    May 20, 2021

(30) Foreign Application Priority Data
Dec. 21, 2017   (JP) .............. JP2017-245081

(51) Int. Cl.
*H02J 1/00*      (2006.01)
*H02S 40/34*     (2014.01)
*H05B 45/10*     (2020.01)

(52) U.S. Cl.
CPC .............. *H02J 1/00* (2013.01); *H02S 40/34* (2014.12); *H05B 45/10* (2020.01)

(58) Field of Classification Search
None
See application file for complete search history.

(56) References Cited

U.S. PATENT DOCUMENTS

| 2006/0164223 A1 | 7/2006 | Gilbert et al. |
| 2006/0172782 A1 | 8/2006 | Planning et al. |
| 2011/0074353 A1 | 3/2011 | Miwa et al. |
| 2016/0139208 A1 | 5/2016 | Tsuruta |

(Continued)

FOREIGN PATENT DOCUMENTS

| EP | 2302759 A2 | 3/2011 |
| JP | 2010266981 A | 11/2010 |

(Continued)

OTHER PUBLICATIONS

Nov. 27, 2018, International Search Report issued in the International Patent Application No. PCT/JP2018/040143.

(Continued)

*Primary Examiner* — Cassandra F Cox
(74) *Attorney, Agent, or Firm* — Kenja IP Law PC

(57) ABSTRACT

Disclosed is a connection apparatus capable of supplying power supplied from a power supply module to a load. The connection apparatus includes: a connection unit connectable with the power supply module; a light emission element; and a light emission controller for controlling the light emission element, wherein the light emission controller causes, upon detection of a connection of the power supply module to the connection unit, the light emission element to emit light for a first predetermined time.

7 Claims, 4 Drawing Sheets

(56) References Cited

U.S. PATENT DOCUMENTS

2018/0310384 A1* 10/2018 Chang .................. G10L 15/22

FOREIGN PATENT DOCUMENTS

| | | |
|---|---|---|
| JP | 2011072138 A | 4/2011 |
| JP | 2016096645 A | 5/2016 |

OTHER PUBLICATIONS

Jun. 23, 2020, International Preliminary Report on Patentability issued in the International Patent Application No. PCT/JP2018/040143.

Mar. 25, 2021, the Extended European Search Report issued by the European Patent Office in the corresponding European Patent Application No. 18893235.4.

* cited by examiner

CONNECTION APPARATUS

TECHNICAL FIELD

The present disclosure relates to a connection apparatus.

BACKGROUND

In recent years, there has been a growing demand for portable energy harvesting apparatuses that generate electric power in accordance with the external environment so that users can supply power to loads such as portable electronic devices, including smartphones, notebook personal computers (PCs) and tablet PCs, even in outdoor areas where they cannot obtain commercial power supply. Examples of such an energy harvesting apparatus include a solar cell module including solar cells that generate power using light energy such as solar light.

When supplying power to a load using a power supply module such as a solar cell module, it is conceivable to employ such a configuration where the power supply module is connected to a connection apparatus to supply power to the load connected to the connection apparatus.

In this case, it is desirable that the user can recognize that the power supply module has been securely connected to the connection apparatus. One known way of allowing users to recognize the connection of the connector is to use a buzzer that produces sound when the connector has been connected (see PTL 1).

CITATION LIST

Patent Literature

PTL 1: JP2010266981A

SUMMARY

Technical Problem

Power supply modules such as solar cell modules are limited in terms of the amount of available power. Hence, it has been required to allow, at low power consumption, users to recognize that the power supply module has been connected to the connection apparatus.

Accordingly, an object of the present disclosure is to solve the above-described problem, and to provide a connection apparatus capable of allowing, at low power consumption, users to recognize the connection of a power supply module.

Solution to Problem

An object of the present disclosure is to advantageously solve the above problem, and the disclosed connection apparatus is a connection apparatus capable of supplying power supplied from a power supply module to a load, the connection apparatus comprising: a connection unit connectable with the power supply module; a light emission element; and a light emission controller for controlling the light emission element, wherein the light emission controller causes, upon detection of a connection of the power supply module to the connection unit, the light emission element to emit light for a first predetermined time. With such a configuration, it is possible to allow users to recognize, by means of light emission of the light emission element, that the power supply module has been connected to the connection unit. Further, by causing the light emission element to emit light only for the first predetermined time and then turning off the light emission element, it is possible to reduce power consumption. In this way, the disclosed connection apparatus can allow, at low power consumption, users to recognize the connection of the power supply module.

It is preferred that the disclosed connection apparatus further comprises an output controller for controlling supply of power from the connection apparatus to the load, wherein the output controller cuts off, upon detection of a connection of the power supply module to the connection unit, the supply of the power to the load for a second predetermined time that is longer than the first predetermined time. With such a configuration, it is possible to ensure that the light emission element emits light regardless of the type of the load connected to the connection apparatus.

In the disclosed connection apparatus, it is preferred that the output controller includes a resistor, a capacitor and a transistor. With such a configuration, it is possible to cut off the supply of power to the load for the second predetermined time with a simple configuration.

In the disclosed connection apparatus, it is preferred that the output controller includes a timer. With such a configuration, it is possible to accurately determine the second predetermined time.

In the disclosed connection apparatus, it is preferred the light emission controller includes a resistor, a capacitor, and a transistor. With such a configuration, it is possible to allow the light emission element to emit light for the first predetermined time with a simple configuration.

In the disclosed connection apparatus, it is preferred that the light emission controller includes a timer. With such a configuration, it is possible to accurately determine the first predetermined time.

In the disclosed connection apparatus, it is preferred that the connection unit is a connector including an electrode which receives power from the power supply module.

In the disclosed connection apparatus, it is preferred that the light emission element is a light emission diode. With such a configuration, it is possible to further reduce power consumption when allowing users to recognize the connection of the power supply module.

Advantageous Effect

According to the present disclosure, it is possible to provide a connection apparatus capable of allowing, at low power consumption, users to recognize the connection of a power supply module.

DETAILED DESCRIPTION

Figure 1:
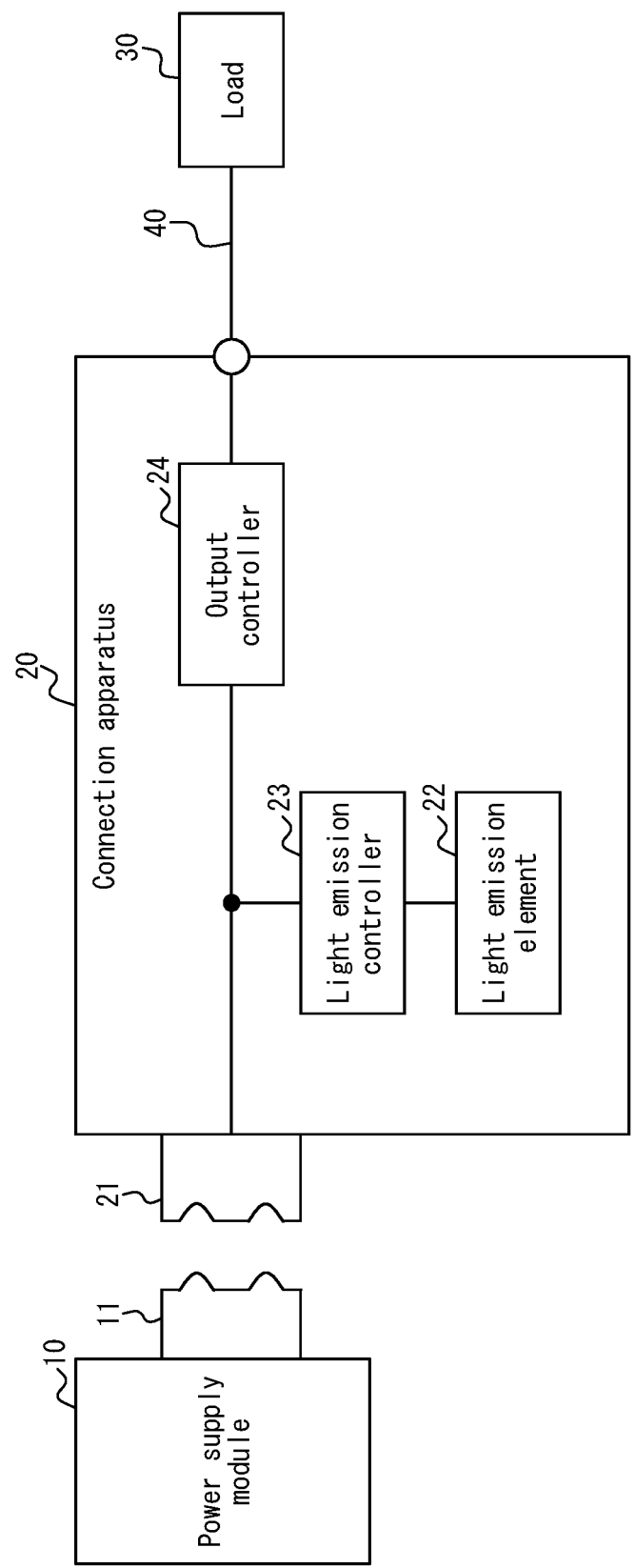
FIG. 1 is a block diagram showing a schematic configuration of a connection apparatus according to an embodiment of the present disclosure.

Hereinafter, an embodiment of the present disclosure will be described with reference to the accompanying drawings. The common components in the drawings are denoted by the same reference numerals.

FIG. 1 is a block diagram showing a schematic configuration of a connection apparatus 20 according to an embodiment of the present disclosure. The connection apparatus 20 is connectable to a power supply module 10 and can receive power from the power supply module 10 when connected to the power supply module 10. FIG. 1 shows a state in which the power supply module 10 is not connected to the connection apparatus 20. Further, the connection apparatus 20 is connectable to a load 30 via a cable 40. The connection apparatus 20 can supply power, supplied from the power supply module 10, to the load 30 via the cable 40.

The connection apparatus 20 includes a connection unit 21 connectable to the power supply module 10. The connection apparatus 20 includes, as functional blocks, a light emission element 22, a light emission controller 23, and an output controller 24.

The connection unit 21 is mechanically connectable to a connection unit 11 of the power supply module 10. For example, the connection unit 21 may have a shape corresponding to the shape of the connection unit 11 of the power supply module 10 so that the connection apparatus 20 and the power supply module 10 are mechanically connected together by the connection unit 21 and the connection unit 11 being fitted to each other.

The connection unit 21 is electrically connected to the power supply module 10 by mechanically being connected to the connection unit 11 of the power supply module 10. When the connection unit 21 and the connection unit 11 of the power supply module 10 are mechanically connected, the connection apparatus 20 can receive power from the power supply module 10. The connection unit 21 may be, for example, a connector including an electrode which can receive power from the power supply module 10.

The power supply module 10 may be a power generation module that generates power according to the external environment. The power supply module 10 may be, for example, a power generation module including a solar cell that photoelectrically converts incident light such as sunlight or room light to generate power. Alternatively, the power supply module 10 may be, for example, a power generation module that generates power using energy such as geothermal energy.

The power supply module 10 is not limited to a power generation module and may be a battery module including a primary or secondary battery. The secondary battery may be, for example, a lithium-ion battery or a nickel-metal hydride battery.

The light emission element 22 is an element that emits light when a current flows therethrough. The light emission element 22 may be, for example, a light emission diode (LED) or a light bulb. In particular, when the light emitting element 22 is a light emission diode, it is possible to cause the light emission element 22 to emit light at low power consumption.

The light emission controller 23 controls the light emission element 22. The light emission controller 23 detects a connection of the power supply module 10 to the connection unit 21. The light emission controller 23, for example, detects whether a voltage has been applied to the electrode of the connection unit 21 to detect a connection of the power supply module 10 to the connection unit 21.

When the light emission controller 23 has detected that the power supply module 10 is connected to the connection unit 21, the light emission controller allows a current to flow through the light emission element 22 for a first predetermined time to cause the light emission element 22 to emit light. When the first predetermined time has elapsed after detecting the connection of the power supply module 10 to the connection unit 21, the light emission controller 23 turns off the light emission element 22. The first predetermined time is, for example, several seconds or so. The light emission controller 23 may be configured, for example, as a circuit including a capacitor and define the first predetermined time by utilizing a time constant for charging the capacitor. The light emission controller 23 may include, for example, a timer and define the first predetermined time by the timer.

Figure 2A:
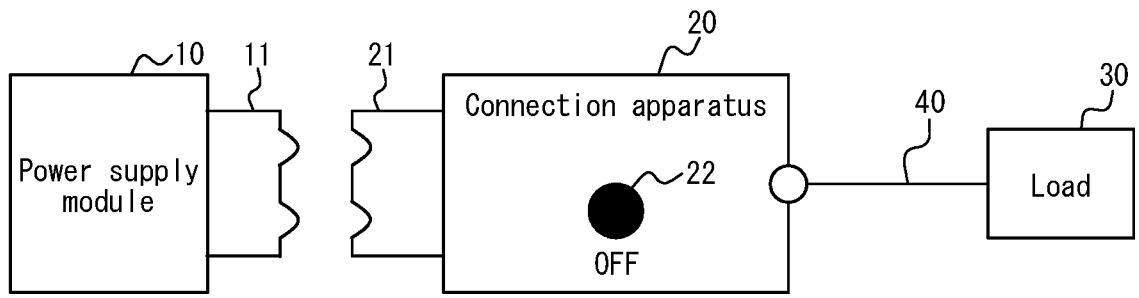
FIG. 2A is a diagram showing an operation of a light emission element of the connection apparatus of FIG. 1.
Figure 2B:
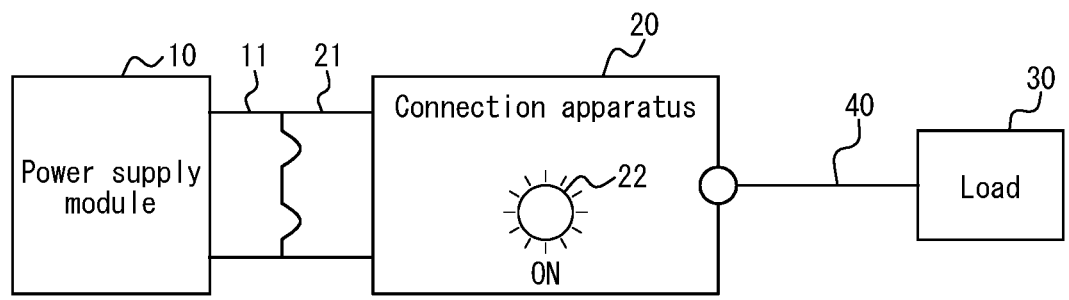
FIG. 2B is a diagram showing an operation of a light emission element of the connection apparatus of FIG. 1.
Figure 2C:
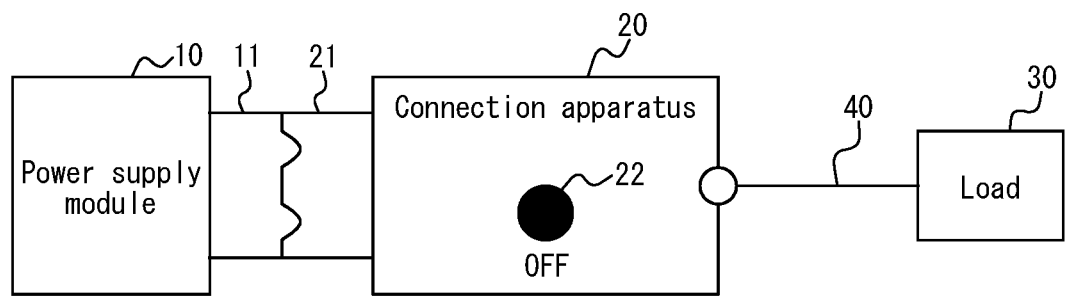
FIG. 2C is a diagram showing an operation of a light emission element of the connection apparatus of FIG. 1.

FIGS. 2A to 2C show how the light emission controller 23 controls the light emission element 22. In FIGS. 2A to 2C, as the components of the connection apparatus 20, components other than the light emission element 22 are not shown.

FIG. 2A is a diagram showing a state where the power supply module 10 is not connected to the connection apparatus 20. In a state where the power supply module 10 is not connected to the connection apparatus 20, no power is supplied to the connection apparatus 20, so that the light emission element 22 is turned off.

FIG. 2B is a diagram showing a state immediately after the power supply module 10 has been connected to the connection apparatus 20. Upon detection of a connection of the power supply module 10 to the connection apparatus 20, the light emission controller 23 turns on the light emission element 22 to emit light. Thus, the user can easily recognize that the power supply module 10 has been electrically connected to the connection apparatus 20 and the supply of power from the power supply module 10 to the connection apparatus 20 has started.

FIG. 2C is a diagram showing a state after the first predetermined time has elapsed since the connection of the power supply module 10 to the connection apparatus 20. When the first predetermined time has elapsed after detection of the connection of the power supply module 10 to the connection apparatus 20, the light emission controller 23 turns off the light emission element 22 to stop emission of light. This prevents wasteful power consumption due to a continued flow of a current passing through the light emission element 22 even after the user has already recognized the connection of the power supply module 10 to the connection apparatus 20.

In a case where a plurality of connection apparatuses 20 is provided and power supply modules 10 are to be connected to the respective connection apparatuses 20 at the same time, it is difficult to allow the user to recognize individual connections by notifying the user of the detection of connection using a sound such as that from a buzzer. In contrast, the connection apparatus 20 according to the present embodiment utilizes light emission from the light emission element 22 for user's recognition of connection between the power supply module 10 and the connection apparatus 20. Hence, even when power supply modules 10 are connected one by one to the plurality of connection apparatuses 20 at the same time, the user can recognize the individual connections. Notification of the detection of connection using a sound such as that from a buzzer may cause noise problems. In contrast, the connection apparatus 20 according to the present embodiment does not cause noise problems because light emission from the light emission element 22 is utilized to allow the user to recognize the connection between the power supply module 10 and the connection apparatus 20.

The output controller 24 controls supply of power from the connection apparatus 20 to the load 30. Examples of the load 30 include radios, lighting devices, loudspeakers, displays, electric toys, and secondary batteries.

The output controller 24 detects a connection of the power supply module 10 to the connection unit 21. The output controller 24, for example, detects whether a voltage has been applied to the electrode of the connection unit 21 to detect a connection of the power supply module 10 to the connection unit 21.

The output controller 24 cuts off, upon detecting that the power supply module 10 has been connected to the connection unit 21, the supply of power from the connection apparatus 20 to the load 30 for a second predetermined time. The output controller 24 may, for example, be configured to have a switch which can disconnect a connection between the electrode within the connection unit 21 and the output terminal of the connection apparatus 20. The output controller 24 can control the output of the connection apparatus 20 by turning off the switch so that no power is supplied from the power supply module 10 to the load 30 for the second predetermined time.

The second predetermined time is longer than the first predetermined time. Thus, when the power supply module 10 is connected to the connection unit 21, the output controller 24 controls the supply of power from the connection apparatus 20 to the load 30 such that no power is supplied from the connection apparatus 20 to the load 30 during the time when the light emission controller 23 causes the light emission element 22 to emit light.

The output controller 24 controls the supply of power from the connection apparatus 20 to the load 30 so as to supply power from the connection apparatus 20 to the load 30 when the second predetermined time has elapsed after detection of the connection of the power supply module 10 to the connection unit 21.

The output controller 24 may be configured, for example, as a circuit including a capacitor and utilize a time constant for charging the capacitor to define the second predetermined time. The output controller 24 may include, for example, a timer, and define the second predetermined time by the timer.

In the manner described above, the output controller 24 controls the supply of power such that the power supplied from the power supply module 10 is not supplied to the load 30 for the second predetermined time that is longer than the first predetermined time even when the power supply module 10 is connected to the connection apparatus 20. This ensures that the light emission element 22 is caused to emit light for the first predetermined time after the power supply module 10 has been connected to the connection apparatus 20, no matter what kind of load is connected to the connection apparatus 20 as the load 30. Further, even when the load 30 is not connected to the connection apparatus 20, it is possible to ensure that the light emission element 22 is caused to emit light for the first predetermined time after the power supply module 10 has been connected to the connection apparatus 20.

Figure 3:
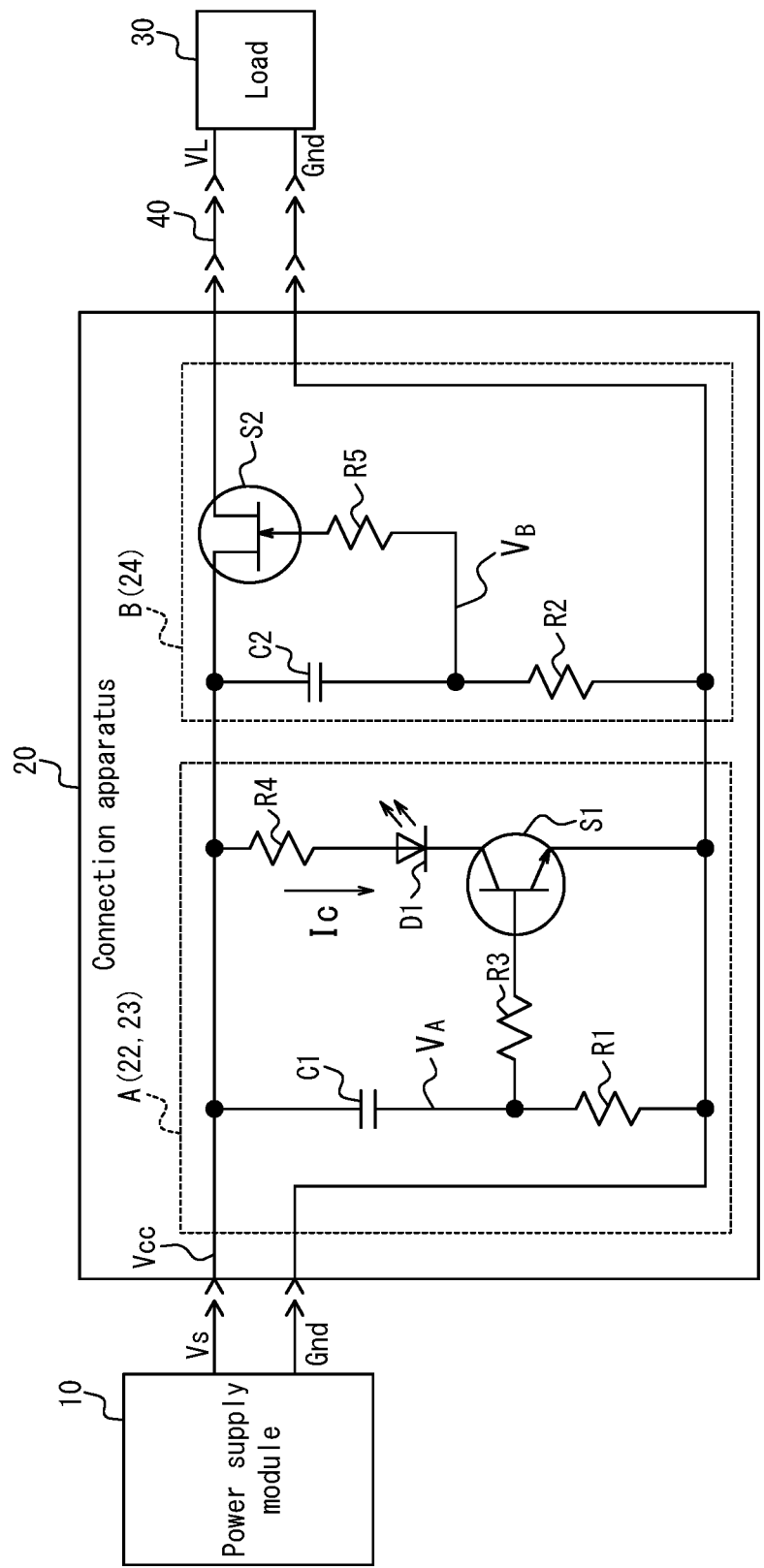
FIG. 3 is a diagram showing an example of a circuit configuration of a connection apparatus according to an embodiment of the present disclosure.
Figure 4:
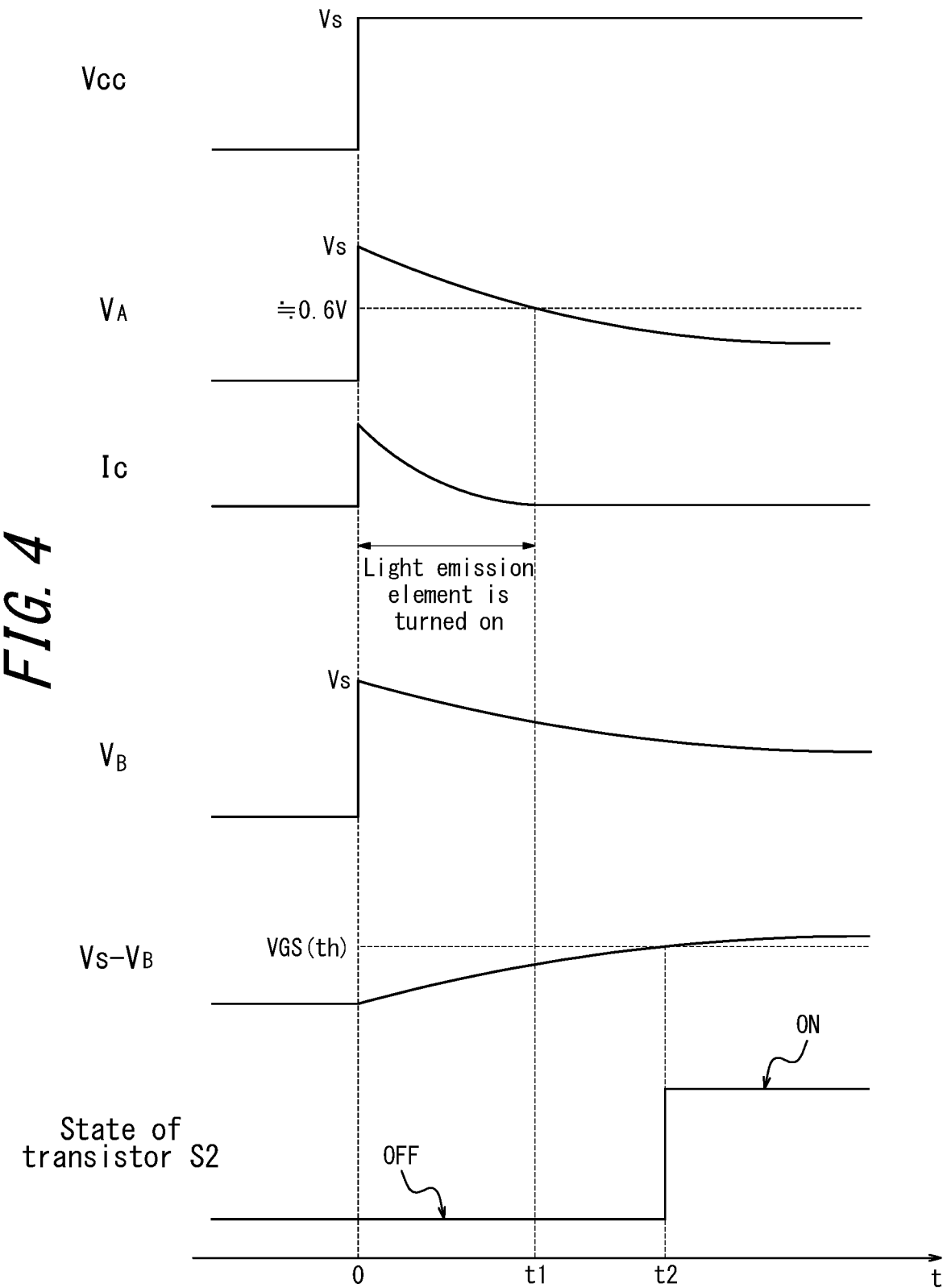
FIG. 4 is a diagram showing changes with time of voltage/current within the circuit configuration shown in FIG. 3.

Referring to FIGS. 3 and 4, an example of a circuit configuration of the connection apparatus 20 according to an embodiment of the present disclosure will be described. FIG. 3 is a diagram showing an example of a circuit configuration of the connection apparatus 20 according to an embodiment of the present disclosure. FIG. 4 is a diagram showing voltage changes with time of node Vcc, VA and VB, changes with time of current Ic flowing through a light emission diode D1, changes with time of the state of a transistor S2, etc., in the circuit configuration shown in FIG. 3.

In the circuit configuration of the connection apparatus 20 shown in FIG. 3, the left area A surrounded by a broken line corresponds to the light emission element 22 and the light emission controller 23 shown in FIG. 1. The right area B surrounded by a broken line corresponds to the output controller 24 shown in FIG. 1.

An operation of the circuit in the region A corresponding to the light emission element 22 and the light emission controller 23 will be described. The region A contains a resistor R1, a resistor R3, a resistor R4, a capacitor C1, a light emission diode D1, and a transistor S1. The transistor S1 is an npn transistor. In the region A, the light emission diode D1 functions as the light emission element 22 shown in FIG. 1, and the other elements function as the light emission controller 23 shown in FIG. 1.

The node Vcc in FIG. 3 shows a voltage of the electrode in the connection unit 21 shown in FIG. 1. That is, when the power supply module 10 capable of supplying voltage Vs is connected to the connection apparatus 20, Vcc equals to Vs. FIG. 4 shows changes with time of the voltage of Vcc when the power supply module 10 is connected to the connection apparatus 20 at time t=0. As shown in FIG. 4, at time before t=0, Vcc is zero, but equals to Vs after t=0.

The node VA in the region A is an intermediate node of the capacitor C1 and the resistor R1 which connect Vcc and Gnd in series. As shown in FIG. 4, VA becomes equal to Vs when the power supply module 10 is connected to the connection apparatus 20 at t=0, and then decreases in accordance with a time constant determined by the capacitor C1 and the resistor R1 as the capacitor C1 is charged.

The node VA is connected to the base of the transistor S1 via the resistor R3. During the time where the voltage of VA is higher than a voltage at which the transistor S1 is turned on (typically about 0.6V), i.e., between t=0 and t=t1 shown in FIG. 4, the transistor S1 is turned on so that a current flows through the light emission diode D1.

Ic in the region A denotes a current that flows through the light emission diode D1. As shown in FIG. 4, between t=0 and t=t1 where the transistor S1 is turned on, Ic is positive and a current flows through the light emission diode D1. As a result, between t=0 and t=t1, the light emission diode D1 emits light. The time from t=0 to t=t1 corresponds to the first predetermined time.

Next, an operation of the circuit in the region B corresponding to the output controller 24 will be described. The region B contains a resistor R2, a resistor R5, a capacitor C2, and a transistor S2. The transistor S2 is a p-channel metal-oxide semiconductor field-effect transistor (MOSFET).

The node VB in the region B is an intermediate node of the capacitor C2 and the resistor R2 which connect Vcc and Gnd in series. As shown in FIG. 4, VB becomes equal to Vs when the power supply module 10 is connected to the connection apparatus 20 at t=0, and then decreases in accordance with a time constant determined by the capacitor C2 and the resistor R2 as the capacitor C2 is charged.

The node VB is connected to the gate of the transistor S2 via the resistor R5. The voltage of Vs-VB corresponding to the absolute value of the voltage between the gate and source of the transistor S2 is shown in FIG. 4. During the time when the voltage of Vs-VB is lower than VGS (th), a threshold value of the transistor S2, i.e., between t=0 and t=t2 shown in FIG. 4, the transistor S2 is turned off. Thus, between t=0 and t=t2, the connection apparatus 20 does not supply power supplied from the power supply module 10 to the load 30.

When the voltage of Vs-VB becomes higher than VGS (th), a threshold voltage of the transistor S2, i.e., at t=t2 and later shown in FIG. 4, the transistor S2 is turned on. Thus, at t=t2 and later, the connection apparatus 20 supplies the power supplied from the power supply module 10 to the load 30.

The time from t=0 to t=t2 corresponds to the second predetermined time. The time constant determined by the resistor R2 and the capacitor C2 is greater than the time constant determined by the resistor R1 and the capacitor C1. For example, when the resistance values of the resistor R1 and the resistor R2 are similar, the capacitance of the capacitor C2 is greater than the capacitance of the capacitor C1. Thus, the second predetermined time is longer than the first predetermined time.

The foregoing description merely illustrates an embodiment of the present disclosure and it goes without saying that various modifications and alterations may be made in the claims.

For example, in the present embodiment, both the light emission controller 23 and the output controller 24 are configured to detect a connection of the power supply module 10 to the connection unit 21. However, only one of them may be configured to detect the connection. For example, when only the light emission controller 23 is configured to detect a connection of the power supply module 10 to the connection unit 21, the light emission controller 23 notifies, upon detection of connection, the output controller 24 of the detection of connection. Further, for example, when only the output controller 24 is configured to detect a detection of the power supply module 10 to the connection unit 21, the output controller 24 notifies, upon detection of connection, the light emission controller 23 of detection of connection.

INDUSTRIAL APPLICABILITY

According to the present disclosure, it is possible to provide a connection apparatus capable of allowing, at low power consumption, users to recognize the connection of a power supply module.

REFERENCE SIGNS LIST

10 Power supply module
11 Connection unit
20 Connection apparatus
21 Connection unit
22 Light emission element
23 Light emission controller
24 Output controller
30 Load
40 Cable

The invention claimed is:

1. A connection apparatus capable of supplying power supplied from a power supply module to a load, the connection apparatus comprising:
 a connection unit connectable with the power supply module;
 a light emission element;
 a light emission controller for controlling the light emission element; and
 an output controller for controlling supply of power from the connection apparatus to the load, wherein
 the light emission controller causes, upon detection of a connection of the power supply module to the connection unit, the light emission element to emit light for a first predetermined time, and
 the output controller cuts off, upon detection of a connection of the power supply module to the connection unit, the supply of the power to the load for a second predetermined time that is longer than the first predetermined time.

2. The connection apparatus of claim 1, wherein the output controller includes a resistor, a capacitor, and a transistor.

3. The connection apparatus of claim 1, wherein the output controller includes a timer.

4. The connection apparatus of claim 1, wherein the light emission controller includes a resistor, a capacitor, and a transistor.

5. The connection apparatus of claim 1, wherein the light emission controller includes a timer.

6. The connection apparatus of claim 1, wherein the connection unit is a connector including an electrode which receives power from the power supply module.

7. The connection apparatus of claim 1, wherein the light emission element is a light emission diode.

* * * * *